US012132572B2

(12) United States Patent
Wei

(10) Patent No.: US 12,132,572 B2
(45) Date of Patent: Oct. 29, 2024

(54) METHOD AND APPARATUS FOR DATA TRANSMISSION BASED ON HYBRID AUTOMATIC REPEAT REQUEST

(71) Applicant: ZTE Corporation, Guangdong (CN)

(72) Inventor: Ning Wei, Guangdong (CN)

(73) Assignee: ZTE Corporation, Shenzhen (CN)

( * ) Notice: Subject to any disclaimer, the term of this patent is extended or adjusted under 35 U.S.C. 154(b) by 618 days.

(21) Appl. No.: 17/313,806

(22) Filed: May 6, 2021

(65) Prior Publication Data

US 2021/0258103 A1    Aug. 19, 2021

Related U.S. Application Data

(63) Continuation of application No. PCT/CN2018/115471, filed on Nov. 14, 2018.

(51) Int. Cl.
*H04L 1/1812* (2023.01)
*H04L 1/00* (2006.01)

(52) U.S. Cl.
CPC .......... *H04L 1/1812* (2013.01); *H04L 1/0008* (2013.01)

(58) Field of Classification Search
CPC ... H04L 1/1812; H04L 1/0007; H04L 1/0008; H04L 1/0083; H04L 1/1887; H04L 1/0041; H04L 69/22; H04W 28/065
See application file for complete search history.

(56) References Cited

U.S. PATENT DOCUMENTS

| 8,400,968 | B2 | 3/2013 | Liu et al. |
| 9,876,614 | B1 | 1/2018 | Sun et al. |
| 10,153,868 | B2 | 12/2018 | Kim et al. |
| 2007/0288980 | A1 | 12/2007 | Niu et al. |

(Continued)

FOREIGN PATENT DOCUMENTS

| CN | 102652418 A | 8/2012 |
| CN | 106301710 A | 1/2017 |

(Continued)

OTHER PUBLICATIONS

Chinese Notification to Complete Formalities of Registration issued in CN Patent Application No. 201880099542.5, dated Feb. 25, 2023, 4 pages. English translation included.

(Continued)

*Primary Examiner* — Quoc Thai N Vu
(74) *Attorney, Agent, or Firm* — Perkins Coie LLP

(57) ABSTRACT

A method and apparatus for configuration of sidelink channel resource units for sidelink communications in a wireless communication network is disclosed. In one embodiment, a method performed by a wireless communication node, includes: configuring an aggregated MAC protocol data unit (A-MPDU); and transmitting a first message to a wireless communication device, wherein the A-MPDU comprises a plurality of A-MPDU subframes, wherein each of the plurality of A-MPDU subframes comprises at least one padding field and a respective MPDU field, wherein the first message comprises an encoded A-MPDU, wherein the encoded A-MPDU is the A-MPDU encoded by an encoder, wherein each of the at least one padding field has a first length, and wherein the first length is determined by one of the following: a second length of the respective MPDU field and a depth of the encoder.

16 Claims, 9 Drawing Sheets

(56) References Cited

U.S. PATENT DOCUMENTS

| | | | |
|---|---|---|---|
| 2011/0134816 A1 | 6/2011 | Liu et al. | |
| 2011/0249660 A1* | 10/2011 | Noh | H04L 5/0023 370/338 |
| 2012/0195301 A1 | 8/2012 | Choi et al. | |
| 2013/0039297 A1 | 2/2013 | Wang | |
| 2013/0177096 A1* | 7/2013 | Park | H04B 7/0452 375/267 |
| 2016/0262052 A1 | 9/2016 | Kim et al. | |
| 2018/0332502 A1* | 11/2018 | Chu | H04L 1/1671 |

FOREIGN PATENT DOCUMENTS

| | | |
|---|---|---|
| WO | 2015006640 A1 | 1/2015 |
| WO | 2016178815 A1 | 11/2016 |

OTHER PUBLICATIONS

European Communication under Rule 71(3) EPC issued in EP Patent Application No. 18929868.0, dated Apr. 6, 2023, 51 pages.
Chinese office action issued in CN Patent Application No. 201880099542.5, dated Aug. 25, 2022, 28 pages. English translation included.
European Search Report in EP Patent Application No. 18929868.0, dated Oct. 11, 2021, 9 pages.
International Search Report and Written Opinion in International Application No. PCT/CN2018/115471, mailed Aug. 2, 2019, 6 pages.

* cited by examiner

METHOD AND APPARATUS FOR DATA TRANSMISSION BASED ON HYBRID AUTOMATIC REPEAT REQUEST

CROSS-REFERENCE TO RELATED APPLICATIONS

This application is a continuation of and claims priority to International Patent Application No. PCT/CN2018/115471, filed on Nov. 14, 2018, the contents of which are incorporated herein by reference in their entirety.

TECHNICAL FIELD

This disclosure relates generally to wireless communications and, more particularly, to a method and apparatus for data transmission based on a hybride automatic repeat request (HARQ) in a wireless communication network.

BACKGROUND

Hybrid automatic repeat request (HARQ) is a combination of high-rate forward error-correcting coding and automatic repeat request (ARQ) error-control and is one of important techniques to improve transmission robustness. Generally, a transmitter transmits a wireless packet to one or more receivers. When the wireless packet is received but not decoded correctly, the receiver responds with a negative acknowledgement (NACK) as an explicit indication to a decoding error. After receiving the NACK packet, the transmitter starts a retransmission accordingly for the wireless packet, where the retransmission content can be the same as the original transmission or one of its versions with different redundancy encoded bits. The retransmission operation does not terminate until the transmitter receives an acknowledgement (ACK), indicating a successful transmission for this wireless packet. In practice, criteria for terminating the retransmission operation include but is not limited to the reception to ACK packet. During the retransmission operation, combination operation for the original and retransmitted packet (or retransmitted and retransmitted packet) is implemented at receiver side for extra gains.

SUMMARY OF THE INVENTION

The exemplary embodiments disclosed herein are directed to solving the issues related to one or more problems presented in the prior art, as well as providing additional features that will become readily apparent by reference to the following detailed description when taken in conjunction with the accompany drawings. In accordance with some embodiments, exemplary systems, methods, and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

When information bits are continuously encoded, it is difficult for IR_HARQ (Incremental redundancy-hybrid automatic repeat request) technique to carry out soft combination-based decoding operation per MPDU, because partial coded bits may be a function of input bits from different MPDUs. Such a relationship between adjacent MPDUs can result in an erroneous interpretation to coded bits when a retransmission packet without some MPDU, which might be received correctly in the previous transmission. Therefore, a method and apparatus for data transmission based on a HARQ scheme in the present disclosure can achieve MPDU (Or other smaller data unit than A-MPDU)-based HARQ operation.

In one embodiment, a method performed by a wireless communication node, includes: configuring an aggregated MAC protocol data unit (A-MPDU); and transmitting a first message to a wireless communication device, wherein the A-MPDU comprises a plurality of A-MPDU subframes, wherein each of the plurality of A-MPDU subframes comprises at least one padding field and a respective MPDU field, wherein the first message comprises an encoded A-MPDU, wherein the encoded A-MPDU is the A-MPDU encoded by an encoder, wherein each of the at least one padding field has a first length, and wherein the first length is determined by one of the following: a second length of the respective MPDU field and a depth of the encoder.

In another embodiment, method performed by a wireless communication device, includes: receiving a first message from a wireless communication node; and determining an aggregated MAC protocol data unit (A-MPDU), wherein the A-MPDU comprising a plurality of A-MPDU subframes, is configured by the wireless communication node, wherein each of the plurality of A-MPDU subframes comprises at least one padding field and a respective MPDU field, wherein the first message comprises an encoded A-MPDU, wherein the encoded A-MPDU is the A-MPDU encoded by an encoder, wherein each of the at least one padding field has a first length, and wherein the first length is determined by one of the following: a second length of the respective MPDU field and a depth of the encoder.

In another embodiment, a method performed by a wireless communication device, includes: configuring an aggregated MAC protocol data unit (A-MPDU); and transmitting a first message to a wireless communication node, wherein the A-MPDU comprises a plurality of A-MPDU subframes, wherein each of the plurality of A-MPDU subframes comprises at least one padding field and a respective MPDU field, wherein the first message comprises an encoded A-MPDU, wherein the encoded A-MPDU is the A-MPDU encoded by an encoder, wherein each of the at least one padding field has a first length, and wherein the first length is determined by one of the following: a second length of the respective MPDU field and a depth of the encoder.

In another embodiment, a method performed by a wireless communication node, includes: receiving a first message from a wireless communication device; and determining an aggregated MAC protocol data unit (A-MPDU), wherein the A-MPDU comprising a plurality of A-MPDU subframes, is configured by the wireless communication device, wherein each of the plurality of A-MPDU subframes comprises at least one padding field and a respective MPDU field, wherein the first message comprises an encoded A-MPDU, wherein the encoded A-MPDU is the A-MPDU encoded by an encoder, wherein each of the at least one padding field has a first length, and wherein the first length is determined by one of the following: a second length of the respective MPDU field and a depth of the encoder.

Yet in another embodiment, a computing device comprising at least one processor and a memory coupled to the processor, the at least one processor configured to carry out the method.

Yet, in another embodiment, a non-transitory computer-readable medium having stored thereon computer-executable instructions for carrying out the method.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

DETAILED DESCRIPTION OF EXEMPLARY EMBODIMENTS

Figure 1A:
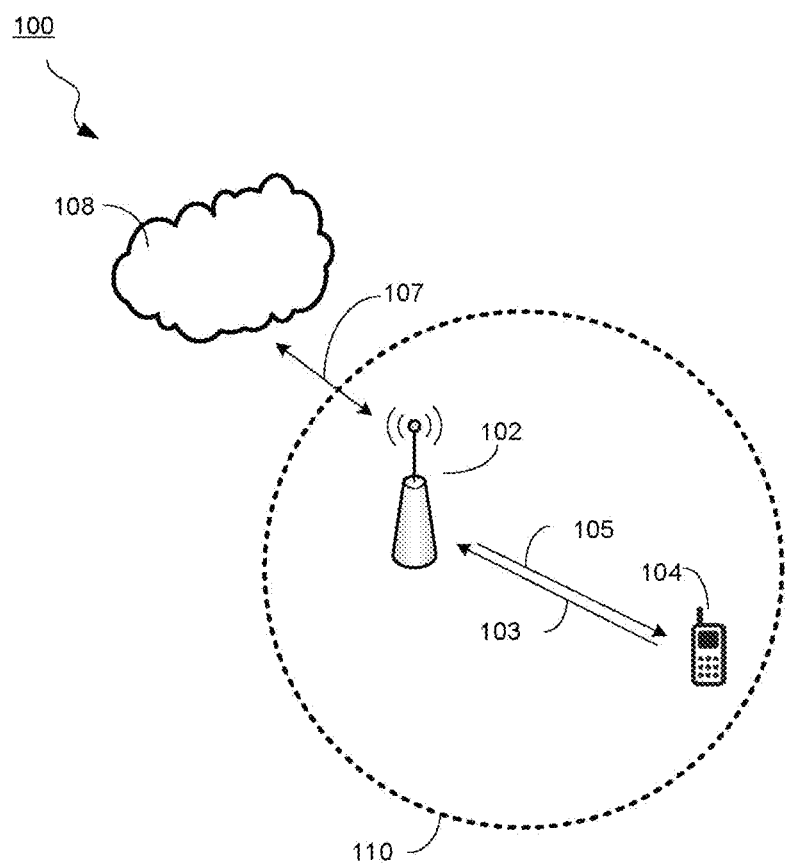
FIG. 1A illustrates an exemplary wireless communication network illustrating achievable modulation as a function of distance from a BS, in accordance with some embodiments of the present disclosure.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described or illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the terms are defined in consideration of their functionality in embodiment of the present invention, and may vary according to the intention of a user or an operator, usage, etc. Therefore, the definition should be made on the basis of the overall content of the present specification.

FIG. 1A illustrates an exemplary wireless communication network 100, in accordance with some embodiments of the present disclosure. In a wireless communication system, a network side communication node can be a node B, an E-UTRA Node B (also known as Evolved Node B, eNodeB or eNB), a gNodeB (also known as gNB) in new radio (NR) technology, a pico station, a femto station, a wireless access point (AP) in wireless local area network (WLAN), or the like. A terminal-side communication device can be a long range communication system like a mobile phone, a smart phone, a personal digital assistant (PDA), tablet, laptop computer, or a short range communication system such as, for example a wearable device, a vehicle with a vehicular communication system, a wireless station (STA) in wireless local area network (WLAN), and the like. A network communication node and a terminal-side communication device are represented by a BS 102 and a UE 104, respectively, and in all the embodiments in this disclosure hereafter, and are generally referred to as "wireless communication nodes" and "wireless communication device" herein. Such wireless communication nodes and devices may be capable of wireless and/or wired communications, in accordance with various embodiments of the invention. It is noted that all the embodiments are merely preferred examples, and are not intended to limit the present disclosure. Accordingly, it is understood that the system may include any desired combination of BSs 102 and UEs 104, while remaining within the scope of the present disclosure.

Referring to FIG. 1A, the wireless communication network 100 includes a BS 102, and a UE 104. In some embodiments, the UE 104 forms direct communication (i.e., uplink) channels 103 with the BS 102. In some embodiments, the UE 104 also forms direct communication (i.e., downlink) channels 105 with the BS 102, respectively. The direct communication channels between the UE 104 and the BS 102 can be through interfaces such as an Uu interface, which is also known as E-UTRA air interface. In some embodiments, the UE 104 comprises a plurality of transceivers which enables the UE 104 to support connectivity so as to receive data from the BS 102. The BS 102 is connected to a core network (CN) 108 through an external interface 107, e.g., an Iu interface, or an NG interface. In some other embodiments, a serving cell 110 is covered by the BS 102.

Figure 1B:
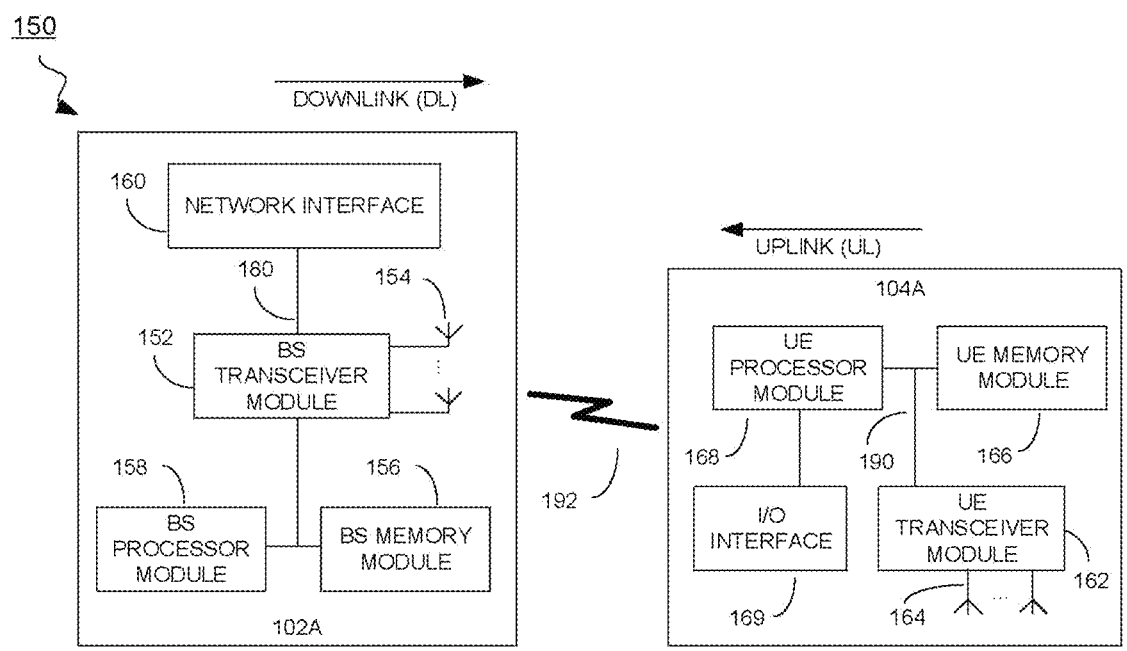
FIG. 1B illustrates a block diagram of an exemplary wireless communication system for a slot structure information indication, in accordance with some embodiments of the present disclosure.

FIG. 1B illustrates a block diagram of an exemplary wireless communication system 150, in accordance with some embodiments of the present disclosure. The system 150 may include components and elements configured to support known or conventional operating features that need not be described in detail herein. In some embodiments, the system 150 can be used to transmit and receive data symbols in a wireless communication environment such as the wireless communication network 100 of FIG. 1A, as described above.

The system 150 generally includes a BS 102, and a UE 104. The BS 102 comprises a BS transceiver module 152, a BS antenna array 154, a BS memory module 156, a BS processor module 158, and a network interface 160. In the illustrated embodiment, each module of the BS 102 are coupled and interconnected with one another as necessary via a data communication bus 180. The UE 104 comprises a UE transceiver module 162, a UE antenna 164, a UE memory module 166, a UE processor module 168, and an I/O interface 169. In the illustrated embodiment, each module of the UE 104 are coupled and interconnected with one another as necessary via a date communication bus 190. The BS 102 communicates with the UE 104 via a communication channel 192, which can be any wireless channel or other medium known in the art suitable for transmission of data as described herein.

As would be understood by persons of ordinary skill in the art, the system 150 may further include any number of modules other than the modules shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

A wireless transmission from a transmitting antenna of the UE 104 to a receiving antenna of the BS 102 is known as an uplink (UL) transmission, and a wireless transmission from a transmitting antenna of the BS 102 to a receiving antenna of the UE 104 is known as a downlink (DL) transmission. In accordance with some embodiments, the UE transceiver 162 may be referred to herein as an "uplink" transceiver 162 that includes a RF transmitter and receiver circuitry that are each coupled to the UE antenna 164. A duplex switch (not shown) may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. Preferably, there is close synchronization timing with only a minimal guard time between changes in duplex direction. The UE transceiver 162 communicates through the UE antenna 164 with the BS 102 via the wireless communication channel 192. The BS transceiver 152 communications through the BS antenna 154 of a BS (e.g., the first BS 102-1) with the other BS (e.g., the second BS 102-2) via a wireless communication channel 196. The wireless communication channel 196 can be any wireless channel or other medium known in the art suitable for direct communication between BSs.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some exemplary embodiments, the UE transceiver 162 and the BS transceiver 152 are configured to support industry standards such as the Long Term Evolution (LTE) and emerging 5G standards (e.g., NR), and the like. It is understood, however, that the invention is not necessarily limited in application to a particular standard and associated protocols. Rather, the UE transceiver 162 and the BS transceiver 152 may be configured to support alternate, or additional, wireless data communication protocols, including future standards or variations thereof.

The processor modules 158 and 168 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor module may be realized as a microprocessor, a controller, a microcontroller, a state machine, or the like. A processor module may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 158 and 168, respectively, or in any practical combination thereof. The memory modules 156 and 166 may be realized as RAM memory, flash memory, ROM memory, EPROM memory, EEPROM memory, registers, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be executed by processor modules 158 and 168, respectively. The memory modules 156 and 166 may also each include non-volatile memory for storing instructions to be executed by the processor modules 158 and 168, respectively.

The network interface 160 generally represents the hardware, software, firmware, processing logic, and/or other components of the base station 102 that enable bi-directional communication between BS transceiver 152 and other network components and communication nodes configured to communication with the BS 102. For example, network interface 160 may be configured to support internet or WiMAX traffic. In a typical deployment, without limitation, network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BSs or a CN over a wired or wireless connection.

Referring again to FIG. 1A, as mentioned above, the BS 102 repeatedly broadcasts system information associated with the BS 102 to the UE 104 so as to allow the UE 104 to access the network within the cells (e.g., a serving cell 110 for the BS 102) where the BS 102 is located, and in general, to operate properly within the cell. Plural information such as, for example, downlink and uplink cell bandwidths, downlink and uplink configuration, cell information, configuration for random access, etc., can be included in the system information, which will be discussed in further detail below. Typically, the BS 102 broadcasts a first signal carrying some major system information, for example, configuration of the cell 110 through a PBCH (Physical Broadcast Channel). For purposes of clarity of illustration, such a broadcasted first signal is herein referred to as "first broadcast signal." It is noted that the BS 102 may subsequently broadcast one or more signals carrying some other system information through respective channels (e.g., a Physical Downlink Shared Channel (PDSCH)).

Referring again to FIG. 1B, in some embodiments, the major system information carried by the first broadcast signal may be transmitted by the BS 102 in a symbol format via the communication channel 192 (e.g., a PBCH). In accordance with some embodiments, an original form of the major system information may be presented as one or more sequences of digital bits and the one or more sequences of digital bits may be processed through plural steps (e.g., coding, scrambling, modulation, mapping steps, etc.), all of which can be processed by the BS processor module 158, to become the first broadcast signal. Similarly, when the UE 104 receives the first broadcast signal (in the symbol format) using the UE transceiver 162, in accordance with some embodiments, the UE processor module 168 may perform plural steps (de-mapping, demodulation, decoding steps, etc.) to estimate the major system information such as, for example, bit locations, bit numbers, etc., of the bits of the major system information. The UE processor module 168 is also coupled to the I/O interface 169, which provides the UE 104 with the ability to connect to other devices such as computers. The I/O interface 169 is the communication path between these accessories and the UE processor module 168.

Figure 2:
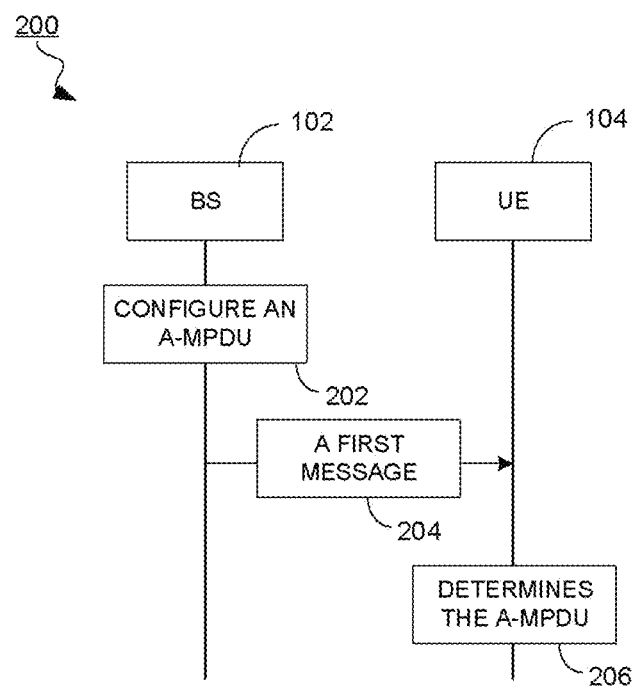
FIG. 2 illustrates a method for configuring an Aggregated-MAC Protocol Data Unit (A-MPDU) for downlink transmission, in accordance with some embodiments of the present disclosure.

FIG. 2 illustrates a method 200 for configuring an Aggregated-MAC Protocol Data Unit (A-MPDU) for downlink transmission, in accordance with some embodiments of the present disclosure. It is understood that additional operations may be provided before, during, and after the method 200 of FIG. 2, and that some operations may be omitted or reordered. The communication system in the illustrated embodiment comprises a BS 102 and a UE 104. In the illustrated embodiments, a UE 104 is in one of at least one serving cell covered by the BS 102, i.e., the UE 104 is in connection with the BS 102. In some embodiments, the BS 102 is a wireless access point or a wireless communication node. In some other embodiments, the UE 104 is a wireless station or a wireless communication device. It should be noted that any numbers of BS 102 or UE 104 can be used and are within the scope of this invention.

The method 200 starts with operation 202 in which the A-MPDU is configured by the BS 102 according to some embodiments. In some embodiments, the A-MPDU comprises a plurality of A-MPDU subframes and an end of frame (EOF) indication. In some embodiments, the number (i.e., N) of the plurality of A-MPDU subframes in the A-MPDU is determined by a higher layer of the BS 102. In some embodiments, each of the A-MPDU subframe comprise a MPDU delimiter field, a MPDU field, and at least one padding field. In some embodiments, the MPDU delimiter comprises an EOF field, a reserved field, a HARQ padding length field, a MPDU length field, a CRC field, and a delimiter signature field, which are discussed in further detail in FIG. 3 below. In some embodiments, the MPDU of the corresponding A-MPDU subframe comprises information bits for wireless communication. In some embodiments, a length and content of the MPDU in each of the plurality of A-MPUD subframes are determined by a higher layer of the BS 102. In some embodiment the at least one padding field comprises at least one of the following: an original padding field (OPF) and at least one HARQ padding field. In some embodiments, when a padding field is an OPF, the OPF is configured with a length so that a summation of the length of the OPF and the length of the corresponding MDPU is 4×a octets, wherein a is a positive integer. For example, when a length of a MPDU is 5 octets, a length of a OPF is 4×b+3 octets, wherein b is a non-negative integer. In this case, a minimum length of 3 octets of an OPF is required. In some embodiments, a padding field can further comprise a HARQ padding field, wherein the HARQ padding field is configured for coding separation. Continue with the example above, when a length of a MPDU field is 5 octets and a length of a OPF is 3 octets, and when a depth of an encoder is 28 bits, a HARQ padding field with a length of 4 octets is added to the padding field so that a summation of the length of the length of the OPF and the length of the HARQ padding field is equal to or greater than K−1 bits.

In some embodiments, the BS 102 configures the at least one padding field in the at least one corresponding A-MPDU subframe according to at least one of the following: the length of the MDPU in the at least one corresponding A-MPDU subframe indicated in the field of the MPDU delimiter, a coding type, and other factors. In some embodiments, for the BS 102, the coding type is determined by a high layer.

In some embodiments, when the length of the MPDU field in the corresponding A-MPDU subframe is 4×a octets, wherein a is a non-negative integer, the at least one padding field comprises at least one HARQ padding field, wherein the at least one HARQ padding field comprises 4×m octets, wherein m is a positive integer. In some embodiments, when the length of the MPDU in the corresponding A-MPDU subframe is 4×a+b octets and when the (4−b)×8 is smaller than K−1, wherein a is a non-negative integer, b is 1, 2, and 3, and K is a depth of an encoder, the at least one padding field comprises an original padding field (OPF) comprising 4−b octets and at least one HARQ padding field comprising K−1−(4−b)×8 bits. In some embodiments, when the length of the MPDU in the corresponding A-MPDU subframe is 4×a+b octets and when the (4−b)×8 is greater than K−1, wherein a is a non-negative integer, b is 1, 2, and 3, and K is the depth of the encoder, the at least one padding field comprises an original padding field (OPF).

In some embodiments, m is determined by the BS 102 or preconfigured by the system. In some embodiments, K is a fixed value, which can be preconfigured by the system. In some embodiments, m is equal to or greater than (K−1)/32.

In some embodiments, m is a minimum value of a roundup of (K−1)/32, i.e., min[(K−1)/32], so as to achieve a better efficiency.

In some embodiments, after configuring the at least one padding for the at least one corresponding A-MPDU subframe in the A-MPDU, the BS 102 transmits the A-MPDU from the MAC layer to the Physical layer, where a PPDU (Physical layer convergence procedure Protocol data unit) is determined. In some embodiments, the PPDU comprises a PSDU (physical layer convergence procedure service data unit) wherein the PSDU comprises a service field and the A-MPDU 300 in the MAC layer determined by the BS 102. The at least one A-MDPU subframe of the A-MPDU in the PSDU is each encoded by the encoder for an efficient HARQ in support of coding separation operations in the MAC and/or the Physical layer.

Figure 3:
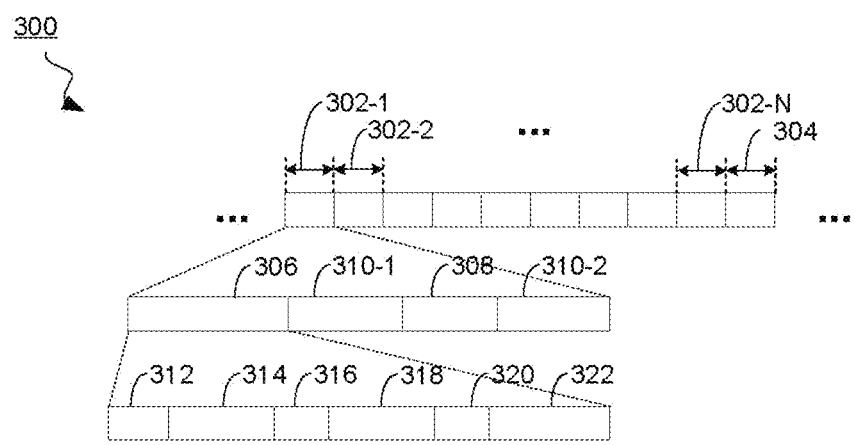
FIG. 3 illustrates a schematic of a frame structure of an Aggregated Mac Protocol Data Unit (A-MPDU) determined by a BS, in accordance with some embodiments of the present disclosure.

FIG. 3 illustrates a schematic of a frame structure 300 of an Aggregated Mac Protocol Data Unit (A-MPDU) determined by a BS 102, in accordance with some embodiments of the present disclosure. It should be noted that the frame structure 300 is only an example. Fields in the frame structure 300 may be omitted, reordered, or resized, which are still within the scope of this invention.

In the illustrated embodiments, the frame structure 300 of the A-MPDU comprises a plurality of A-MPDU subframes 302, e.g., 302-1, 302-2, . . . , and 302-N, and a EOF (end-of-frame) padding 304. In some embodiments, the EOF padding 304 comprises a plurality of MPDU delimiters (e.g., q is a positive integer) and at least one EOF padding subframe (p=0, 1, 2, and 3). In some embodiments, each of the plurality of MPDU delimiters in the EOF padding 304 comprises 4 octets and each of the at least one EOF padding subframe comprises 0-3 octets. In some embodiments, the total length of the EOF padding 304 of the A-MPDU 300 comprises (4×q+p) octets, wherein q is a positive integer and p=0, 1, 2, and 3.

In the illustrated embodiments, the A-MPDU subframe 302 comprises a MPDU delimiter field 306, a MPDU field 308, a first HARQ padding field 310-1, and a second HARQ Padding field 310-2. In some embodiments, the MPDU delimiter field 306 further comprises an EOF field 312, a reserved field 314, a HARQ padding length field 316, a MPDU length field 318, a CRC field 320, and a delimiter signature field 322. In some embodiments, the EOF 312 is an EOF indication comprising 1 bit. In some embodiments, the reserved field is an unused field in the MDPU delimiter field 306 and comprises 1 bit. In some embodiments, the HARQ padding length field 316 indicates the length of the first HARQ padding field 310-1. In some embodiments, the MPDU length field 318 comprises 14 bits, the CRC field 320 comprises 8 bits, and the delimiter signature field 322 comprises 8 bits.

In some embodiments, the first HARQ padding field 310-1 comprises M bits and the second HARQ padding field 310-2 comprises N bits. In some embodiments, M and N each is equal to or greater than K−1, wherein K is the depth or memory of an encoder and K is a positive integer. In some embodiments, the encoder is used for encoding the A-MPDU transmitted from the MAC layer to the physical layer and before transmitted from the BS 102 to the UE 104. In some embodiments, a summation of M and N is equal to 4×m octets, wherein m is a positive integer. In some embodiments, M and N each is equal to 4×m octets, wherein m is a positive integer. In some embodiments, the value of M is indicated by the HARQ padding length field 316 in the MPDU delimiter 306. In some other embodiments, the value of M is indicated in a preamble of the first message.

In some embodiments, the first HARQ padding field 310-1 is located between the MPDU delimiter 306 and the MPDU 308. In some embodiments, the second HARQ padding field 310-2 is located after the MPDU 308.

Figure 4:
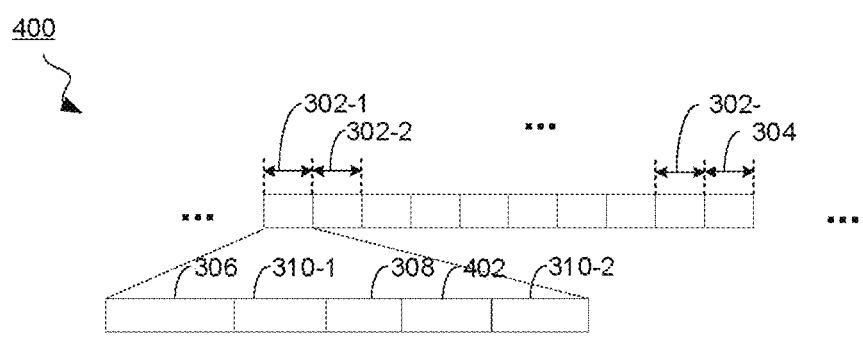
FIG. 4 illustrates a schematic of a frame structure of an Aggregated Mac Protocol Data Unit (A-MPDU) determined by a BS, in accordance with some embodiments of the present disclosure.

FIG. 4 illustrates a schematic of frame structure 400 of an Aggregated Mac Protocol Data Unit (A-MPDU) determined by a BS 102, in accordance with some embodiments of the present disclosure. It should be noted that the frame structure 400 is only an example. Fields in the frame structure 400 may be omitted, reordered, or resized, which are still within the scope of this invention.

In the illustrated embodiments, the frame structure 400 of the A-MPDU comprises a plurality of A-MPDU subframes 302, e.g., 302-1, 302-2, . . . , and 302-N, and a EOF (end-of-frame) padding 304. In some embodiments, the EOF padding 304 comprises a plurality of MPDU delimiters (e.g., q is a positive integer) and at least one EOF padding subframe (p=0, 1, 2, and 3). In some embodiments, each of the plurality of MPDU delimiters in the EOF padding 304 comprises 4 octets and each of the at least one EOF padding subframe comprises 0-3 octets. In some embodiments, the total length of the EOF padding 304 of the A-MPDU 300 comprises (4×q+p) octets, wherein q is a positive integer and p=0, 1, 2, and 3.

In the illustrated embodiments, the A-MPDU subframe 302 comprises a MPDU delimiter field 306, a MPDU field 308, a first HARQ padding field 310-1, a second HARQ padding field 310-2, and a padding field 402. In some embodiments, the MPDU delimiter field 306 further comprises an EOF field 312, a reserved field 314, a HARQ padding length field 316, a MPDU length field 318, a CRC field 320, and a delimiter signature field 322. In some embodiments, the EOF 312 is an EOF indication comprising 1 bits. In some embodiments, the reserved field is an unsued field and comprises 1 bit. In some embodiments, the HARQ padding length field 316 indicates the length of the first HARQ padding field 310-1. In some embodiments, the MPDU length field 318 comprises 14 bits, the CRC field 320 comprises 8 bits, and the delimiter signature field 322 comprises 8 bits.

In some embodiments, the first HARQ padding field 310-1 is located between the MPDU delimiter 306 and the MPDU 308. In some embodiments, the second HARQ padding field 310-2 is located after the MPDU 308. In the illustrated embodiments, the padding field 402 is located between the MPDU 308 and the second HARQ padding field 310-2.

In some embodiments, the first HARQ padding field 310-1 comprises M bits and the second HARQ padding field 310-2 comprises N bits. In some embodiments, M and N each is equal to or greater than K−1, wherein K is the depth or memory of an encoder and K is a positive integer. In some embodiments, the encoder is used for encoding the A-MPDU transmitted from the MAC layer to the physical layer and before transmitted from the BS 102 to the UE 104. In some embodiments, a summation of M and N is equal to 4×m octets, wherein m is a positive integer. In some embodiments, M and N each is equal to 4×m octets, wherein m is a positive integer. In some embodiments, the value of M is indicated by the HARQ padding length field 316 in the MPDU delimiter 306. In some other embodiments, the value of M is indicated in a preamble of the first message.

In some embodiments, the padding field 402 comprises 1-3 octets. In some embodiments, the padding field 402 comprises all zeros. In some embodiments, the HARQ padding field 310 comprises a fixed sequence that is predefined by the system.

Figure 5:
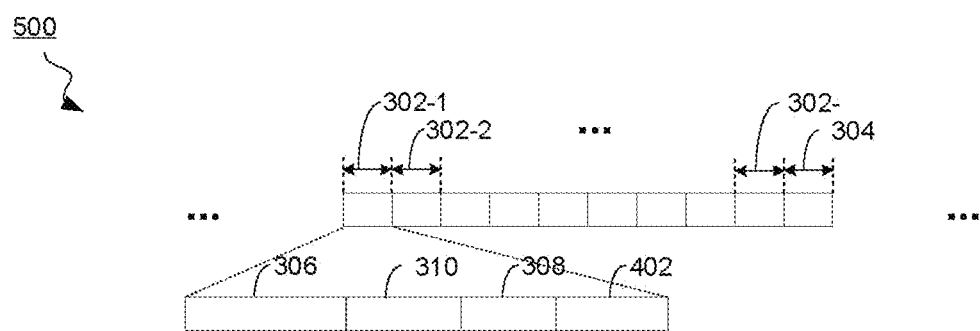
FIG. 5 illustrates a schematic of a frame structure of an Aggregated Mac Protocol Data Unit (A-MPDU) determined by a BS, in accordance with some embodiments of the present disclosure.

FIG. 5 illustrates a schematic of a frame structure 500 of an Aggregated Mac Protocol Data Unit (A-MPDU) determined by a BS 102, in accordance with some embodiments of the present disclosure. It should be noted that the frame structure 500 is only an example. Fields in the frame structure 500 may be omitted, reordered, or resized, which are still within the scope of this invention.

In the illustrated embodiments, the frame structure 500 of the A-MPDU comprises a plurality of A-MPDU subframes 302, e.g., 302-1, 302-2, . . . , and 302-N, and a EOF (end-of-frame) padding 304. In some embodiments, the EOF padding 304 comprises a plurality of MPDU delimiters (e.g., q is a positive integer) and at least one EOF padding subframe (p=0, 1, 2, and 3). In some embodiments, each of the plurality of MPDU delimiters in the EOF padding 304 comprises 4 octets and each of the at least one EOF padding subframe comprises 0-3 octets. In some embodiments, the total length of the EOF padding 304 of the A-MPDU 300 comprises (4×q+p) octets, wherein q is a positive integer and p=0, 1, 2, and 3.

In the illustrated embodiments, the A-MPDU subframe 302 comprises a MPDU delimiter 306, a MPDU 308, a HARQ Padding field 310, and a padding field 402. In some embodiments, the MPDU delimiter field 306 further comprises an EOF field 312, a reserved field 314, a HARQ padding length field 316, a MPDU length field 318, a CRC field 320, and a delimiter signature field 322. In some embodiments, the EOF 312 is an EOF indication comprising 1 bits. In some embodiments, the reserved field is an unsued field and comprises 1 bit. In some embodiments, the HARQ padding length field 316 indicates the length of the first HARQ padding field 310-1. In some embodiments, the MPDU length field 318 comprises 14 bits, the CRC field 320 comprises 8 bits, and the delimiter signature field 322 comprises 8 bits.

In some embodiments, the HARQ padding field 310 is located between the MPDU delimiter field 306 and the MPDU field 308 in an A-MPDU subframe. In some embodiments, the padding field 402 is located after the MPDU 308.

In some embodiments, the HARQ padding field 310 comprises M bits. In some embodiments, the value of M is equal to or greater than K−1, wherein K is the depth or memory of an encoder and K is a positive integer. In some embodiments, the encoder is used for encoding the A-MPDU transmitted from the MAC layer to the physical layer and before transmitted from the BS 102 to the UE 104. In some embodiments, the value of M is equal to 4×m octets, wherein m is a positive integer. In some embodiments, the value of M is indicated by the HARQ padding length field 316 in the MPDU delimiter 306. In some other embodiments, the value of M is indicated in a preamble of the first message. In some embodiments, the padding field 402 comprises 1-3 octets. In some embodiments, the padding field 402 comprises all zeros. In some embodiments, the HARQ padding field 310 comprises one of the following, all zeros, and all ones. In some embodiments, the HARQ padding field 310 comprises a fixed sequence that is predefined by the system.

Figure 6:
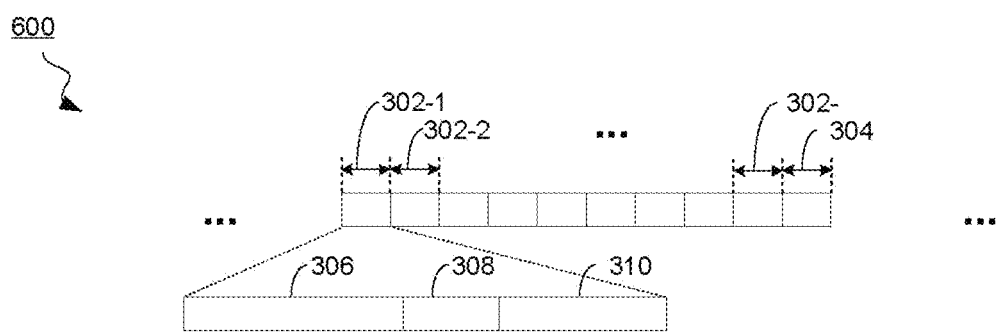
FIG. 6 illustrates a schematic of a frame structure of an Aggregated Mac Protocol Data Unit (A-MPDU) determined by a BS, in accordance with some embodiments of the present disclosure.

FIG. 6 illustrates a schematic of a frame structure 600 of an Aggregated Mac Protocol Data Unit (A-MPDU) determined by a BS 102, in accordance with some embodiments of the present disclosure. It should be noted that the frame structure 600 is only an example. Fields in the frame structure 600 may be omitted, reordered, or resized, which are still within the scope of this invention.

In the illustrated embodiments, the frame structure 500 of the A-MPDU comprises a plurality of A-MPDU subframes 302, e.g., 302-1, 302-2, . . . , and 302-N, and a EOF (end-of-frame) padding 304. In some embodiments, the EOF padding 304 comprises a plurality of MPDU delimiters (e.g., q is a positive integer) and at least one EOF padding subframe (p=0, 1, 2, and 3). In some embodiments, each of the plurality of MPDU delimiters in the EOF padding 304 comprises 4 octets and each of the at least one EOF padding subframe comprises 0-3 octets. In some embodiments, the total length of the EOF padding 304 of the A-MPDU 600 comprises (4×q+p) octets, wherein q is a positive integer and p=0, 1, 2, and 3.

In the illustrated embodiments, the A-MPDU subframe 302 comprises a MPDU delimiter 306, a MPDU 308, and a HARQ Padding field 310. In some embodiments, the MPDU delimiter field 306 further comprises an EOF field 312, a reserved field 314, a HARQ padding length field 316, a MPDU length field 318, a CRC field 320, and a delimiter signature field 322. In some embodiments, the EOF 312 is an EOF indication comprising 1 bits. In some embodiments, the reserved field is an unsued field and comprises 1 bit. In some embodiments, the HARQ padding field 310 comprises a fixed sequence that is predefined by the system. In some embodiments, the MPDU length field 318 comprises 14 bits, the CRC field 320 comprises 8 bits, and the delimiter signature field 322 comprises 8 bits. In some embodiments, the HARQ padding length field 316 is 0 indicating the length of a HARQ padding field between the MPDU delimiter 306 and the MPDU 308 is 0, i.e., there is no HARQ padding field between the MPDU delimiter 306 and the MPDU 308. In some other embodiments, the HARQ padding length field 316 can be other predetermined value indicating that there is no HARQ padding field between the MPDU delimiter 306 and the MPDU 308.

In some embodiments, the HARQ padding field 310 is located after the MPDU 308. In some embodiments, the HARQ padding field 310 comprises M bits. In some embodiments, M is equal to or greater than K−1, wherein K is the depth or memory of an encoder and K is a positive integer. In some embodiments, the encoder is used for encoding the A-MPDU transmitted from the MAC layer to the physical layer and before transmitted from the BS 102 to the UE 104. In some embodiments, the value of M is equal to 4×m octets, wherein m is a positive integer.

Figure 7:
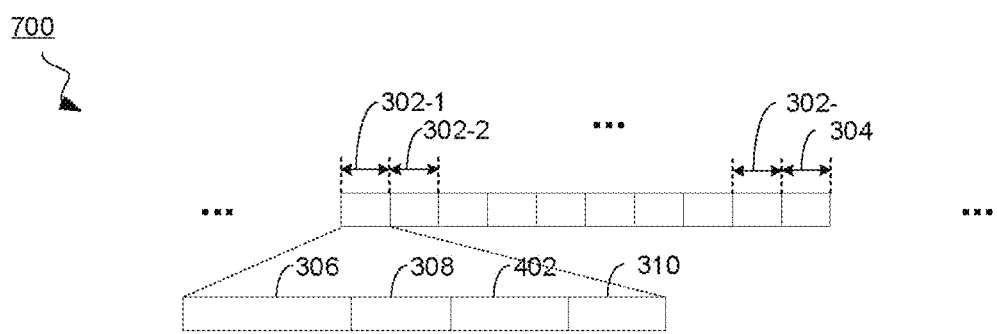
FIG. 7 illustrates a schematic of a frame structure of an Aggregated Mac Protocol Data Unit (A-MPDU) determined by a BS, in accordance with some embodiments of the present disclosure.

FIG. 7 illustrates a schematic of a radio frame structure 700 of an Aggregated Mac Protocol Data Unit (A-MPDU) determined by a BS 102, in accordance with some embodiments of the present disclosure. It should be noted that the frame structure 700 is only an example. Fields in the frame structure 700 may be omitted, reordered, or resized, which are still within the scope of this invention.

In the illustrated embodiments, the frame structure 500 of the A-MPDU comprises a plurality of A-MPDU subframes 302, e.g., 302-1, 302-2, . . . , and 302-N, and a EOF (end-of-frame) padding 304. In some embodiments, the EOF padding 304 comprises a plurality of MPDU delimiters (e.g., q is a positive integer) and at least one EOF padding subframe (p=0, 1, 2, and 3). In some embodiments, each of the plurality of MPDU delimiters in the EOF padding 304 comprises 4 octets and each of the at least one EOF padding subframe comprises 0-3 octets. In some embodiments, the total length of the EOF padding 304 of the A-MPDU 600 comprises (4×q+p) octets, wherein q is a positive integer and p=0, 1, 2, and 3.

In the illustrated embodiments, the A-MPDU subframe 302 comprises a MPDU delimiter field 306, a MPDU field 308, a padding field 402, and a HARQ Padding field 310. In some embodiments, the MPDU delimiter field 306 further comprises an EOF field 312, a reserved field 314, a HARQ padding length field 316, a MPDU length field 318, a CRC field 320, and a delimiter signature field 322. In some embodiments, the EOF 312 is an EOF indication comprising 1 bits. In some embodiments, the reserved field is an unsued field and comprises 1 bit. In some embodiments, the HARQ padding length field 316 indicates the length of the first HARQ padding field 310-1. In some embodiments, the MPDU length field 318 comprises 14 bits, the CRC field 320 comprises 8 bits, and the delimiter signature field 322 comprises 8 bits.

In some embodiments, the padding field 402 is located between the MPDU 308 and the HARQ padding field 310. In some embodiments, the HARQ padding field 310 comprises M bits. In some embodiments, the value of M is equal to or greater than K−1, wherein K is the depth or memory of an encoder and K is a positive integer. In some embodiments, the encoder is used for encoding the A-MPDU transmitted from the MAC layer to the physical layer and before transmitted from the BS 102 to the UE 104. In some embodiments, the value of M is equal to 4×m octets, wherein m is a positive integer. In some embodiments, the padding field 402 comprises 1-3 octets. In some embodiments, the padding field 402 comprises all zeros. In some embodiments, the HARQ padding field 310 comprises a fixed sequence that is predefined by the system.

The method 200 continues with operation 204 in which the BS 102 transmits a first message to the UE 104 according to some embodiments. In some embodiments, the first message comprises the PPDU after at least one of the following processes: encoding, scrambling, interleaving, constellation, and spatial mapping.

The method 200 continues with operation 206 in which the UE 104 determines the A-MPDU in the first message according to some embodiments. In some embodiments, the A-MPDU is determined after an inverse physical operation including at least one of the following: de-scrambling, deinterleaving, and de-mapping. The A-MPDU is then transmitted from the Physical layer to the MAC layer on the UE 104. The at least one MPDU delimiter of the at least one corresponding A-MPDU subframe in the A-MPDU is determined by identifying the corresponding delimiter signature in the at least one MPDU delimiter. In some embodiments, a search window of 4 bytes is used to identify the corresponding delimiter signature in the at least one MPDU delimiter. In some embodiments, a length of the HARQ padding located between a MPDU delimiter and a MPDU in an A-MPDU subframe can be obtained in one of the following: a MPDU delimiter and a preamble in the first message, so as to determine the position of the MPDU in the corresponding A-MPDU subframe. In some embodiments, a length of the HARQ padding located after a MPDU can be calculated.

Figure 8:
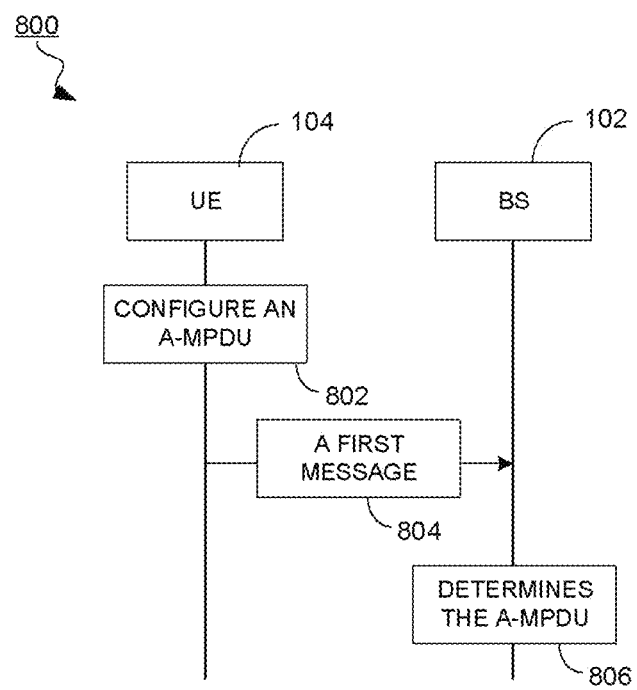
FIG. 8 illustrates a method for configuring an Aggregated-MAC Protocol Data Unit (A-MPDU) for uplink transmission, in accordance with some embodiments of the present disclosure.

FIG. 8 illustrates a method 800 for configuring an Aggregated-MAC Protocol Data Unit (A-MPDU) for uplink transmission, in accordance with some embodiments of the present disclosure. It is understood that additional operations may be provided before, during, and after the method 800 of FIG. 8, and that some operations may be omitted or reordered. The communication system in the illustrated embodiment comprises a BS 102 and a UE 104. In the illustrated embodiments, a UE 104 is in one of at least one serving cell covered by the BS 102, i.e., the UE 104 is in connection with the BS 102. In some embodiments, the BS 102 is a wireless access point or a wireless communication node. In some other embodiments, the UE 104 is a wireless station or a wireless communication device. It should be noted that any numbers of BS 102 or UE 104 can be used and are within the scope of this invention.

The method 800 starts with operation 802 in which the A-MPDU is configured by the UE 104 according to some embodiments. In some embodiments, the A-MPDU comprises a plurality of A-MPDU subframes and an end of frame (EOF) indication. In some embodiments, the number (i.e., N) of the plurality of A-MPDU subframes in the A-MPDU is determined by a higher layer of the BS 102. In some embodiments, each of the A-MPDU subframe comprise a MPDU delimiter field, a MPDU field, and at least one padding field. In some embodiments, the MPDU delimiter comprises an EOF field, a reserved field, a HARQ padding length field, a MPDU length field, a CRC field, and a delimiter signature field, which are discussed in further detail in FIGS. 3-7 above. In some embodiments, the MPDU of the corresponding A-MPDU subframe comprises information bits for wireless communication. In some embodiments, a length and content of the MPDU in each of the plurality of A-MPUD subframes are determined by a higher layer of the UE 104. In some embodiment the at least one padding field comprises at least one of the following: an original padding field (OPF) and at least one HARQ padding field. In some embodiments, when a padding field is an OPF, the OPF is configured with a length so that a summation of the length of the OPF and the length of the corresponding MDPU is 4×a octets, wherein a is a positive integer. For example, when a length of a MPDU is 5 octets, a length of a OPF is 4'b+3 octets, wherein b is a non-negative integer. In this case, a minimum length of 3 octets of an OPF is required. In some embodiments, a padding field can further comprise a HARQ padding field, wherein the HARQ padding field is configured for coding separation. Continue with the example above, when a length of a MPDU field is 5 octets and a length of a OPF is 3 octets, and when a depth of a encorder is 28 bits, a HARQ padding field with a length of 4 octets is added to the padding field so that a summation of the length of the length of the OPF and the length of the HARQ padding field is equal to or greater than K−1 bits.

In some embodiments, the UE 104 configures the at least one padding field in the at least one corresponding A-MPDU subframe according to at least one of the following: the length of the MDPU in the at least one corresponding A-MPDU subframe indicated in the field of the MPDU delimiter, a coding type, and other factors. In some embodiments, the coding type is obtained by the MAC layer from a physical layer on the UE 104 before configuring the at least one corresponding A-MPDU subframe. In some embodiments, the coding type is fixed or preconfigured by the system.

In some embodiments, when the length of the MPDU field in the corresponding A-MPDU subframe is 4×a octets, wherein a is a non-negative integer, the at least one padding field comprises at least one HARQ padding field, wherein the at least one HARQ padding field comprises 4×m octets, wherein m is a positive integer. In some embodiments, when the length of the MPDU in the corresponding A-MPDU subframe is 4×a+b octets and when the (4−b)×8 is smaller than K−1, wherein a is a non-negative integer, b is 1, 2, and 3, and K is a depth of an encoder, the at least one padding field comprises an original padding field (OPF) comprising 4−b octets and at least one HARQ padding field comprising K−1−(4−b)×8 bits. In some embodiments, when the length of the MPDU in the corresponding A-MPDU subframe is 4×a+b octets and when the (4−b)×8 is greater than K−1, wherein a is a non-negative integer, b is 1, 2, and 3, and K is the depth of the encoder, the at least one padding field comprises an original padding field (OPF).

In some embodiments, m is determined by the UE 104 or preconfigured by the system. In some embodiments, K is a fixed value, which can be preconfigured by the system. In some embodiments, m is equal to or greater than (K−1)/32. In some embodiments, m is a minimum value of a roundup of (K−1)/32, i.e., min[(K−1)/32], so as to achieve a better efficiency.

In some embodiments, after configuring the at least one padding for the at least one corresponding A-MPDU subframe in the A-MPDU, the UE 104 transmits the A-MPDU from the MAC layer to the Physical layer, where a PPDU (Physical layer convergence procedure Protocol data unit) is determined. In some embodiments, the PPDU comprises a PSDU (physical layer convergence procedure service data unit) wherein the PSDU comprises a service field and the A-MPDU in the MAC layer determined by the UE 104. The at least one A-MDPU subframe of the A-MPDU in the PSDU is each encoded by the encoder for an efficient HARQ in support of coding separation operations in the MAC and/or the Physical layer.

The method 800 continues with operation 804 in which the UE 104 transmits a first message to the BS 102 according to some embodiments. In some embodiments, the first message comprises the PPDU after at least one of the following processes: encoding, scrambling, interleaving, constellation, and spatial mapping.

The method 800 continues with operation 806 in which the BS 102 determines the A-MPDU in the first message according to some embodiments. In some embodiments, the A-MPDU is determined after an inverse physical operation including at least one of the following: de-scrambling, deinterleaving, and de-mapping. The A-MPDU is then transmitted from the Physical layer to the MAC layer on the BS 102. The at least one MPDU delimiter of the at least one corresponding A-MPDU subframe in the A-MPDU is determined by identifying the corresponding delimiter signature in the at least one MPDU delimiter. In some embodiments, a search window of 4 bytes is used to identify the corresponding delimiter signature in the at least one MPDU delimiter. In some embodiments, a length of the HARQ padding located between a MPDU delimiter and a MPDU in an A-MPDU subframe can be obtained in one of the following: a MPDU delimiter and a preamble in the first message, so as to determine the position of the MPDU in the corresponding A-MPDU subframe. In some embodiments, a length of the HARQ padding located after a MPDU can be calculated.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the some illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a wireless communication node, comprising:
   configuring an aggregated MAC protocol data unit (A-MPDU); and
   transmitting a first message to a wireless communication device configured to receive the first message and to obtain the A-MPDU,
      wherein the A-MPDU comprises a plurality of A-MPDU subframes,
      wherein each of the plurality of A-MPDU subframes comprises at least one padding field and a respective MPDU field,
      wherein the first message comprises an encoded A-MPDU,
      wherein the encoded A-MPDU is the A-MPDU encoded by an encoder,
      wherein each of the at least one padding field has a first length,
      wherein the first length is determined by one of the following: a second length of the respective MPDU field and a depth of the encoder,
      wherein the at least one padding field comprises at least one HARQ padding field,
      wherein each of the plurality of A-MPDU subframes further comprises a MPDU delimiter field,
      wherein the MPDU delimiter field comprises a first field and a second field, and
      wherein the first field indicates a third length of a first HARQ padding field and the second field indicates the second length of the MPDU field in the corresponding A-MPDU subframe.

2. The method of claim 1,
   wherein the at least one padding field comprises the at least one HARQ padding field in response to the second length of the MPDU field in the corresponding A-MPDU subframe comprising 4×a octets,
   wherein the first length of the at least one padding field comprises 4×m octets, and
   wherein a is a non-negative integer, and m is a positive integer.

3. The method of claim 1,
   wherein the at least one padding field comprises an original padding field (OPF) and the at least one HARQ padding field in response to the second length of the MPDU field in the corresponding A-MPDU subframe comprising 4×a+b octets and in response to (4−b)×8 being smaller than K−1,
   wherein the OPF comprises 4−b octets and the at least one HARQ padding field comprises (K−1)−(4−b)×8 octets, and
   wherein a is a non-negative integer, m is a positive integer, b is a positive integer and 1≤b≤3, and K is the depth of the encoder in bit.

4. The method of claim 1,
   wherein the at least one padding field comprises an original padding field (OPF) in response to the second length of the MPDU field in the corresponding A-MPDU subframe having 4×a+b octets and in response to (4−b)×8 being equal to or greater than K−1,
   wherein the first length of the at least one padding field comprises 4−b octets, and
   wherein a is a non-negative integer, m is a positive integer, b is a positive integer and 1≤b≤3, and K is the depth of the encoder in bit.

5. A method performed by a wireless communication device, comprising:
   receiving a first message from a wireless communication node; and
   determining an aggregated MAC protocol data unit (A-MPDU) by processing the first message,
      wherein the A-MPDU comprising a plurality of A-MPDU subframes, is configured by the wireless communication node,
      wherein each of the plurality of A-MPDU subframes comprises at least one padding field and a respective MPDU field,
      wherein the first message comprises an encoded A-MPDU,
      wherein the encoded A-MPDU is the A-MPDU encoded by an encoder,
      wherein each of the at least one padding field has a first length,
      wherein the first length is determined by one of the following: a second length of the respective MPDU field and a depth of the encoder,
      wherein the at least one padding field comprises at least one HARQ padding field,
      wherein each of the plurality of A-MPDU subframes further comprises a MPDU delimiter field, wherein the MPDU delimiter field comprises a first field and a second field, and wherein the first field indicates a third length of a first HARQ padding field and the second field indicates the second length of the MPDU field in the corresponding A-MPDU subframe.

6. The method of claim 5, wherein the at least one padding field comprises the at least one HARQ padding field in response to the second length of the MPDU field in the corresponding A-MPDU subframe comprising 4×a octets, wherein the first length of the at least one padding field comprises 4×m octets, and wherein a is a non-negative integer, and m is a positive integer.

7. The method of claim 5, wherein the at least one padding field comprises an original padding field (OPF) and the at least one HARQ padding field in response to the second length of the MPDU field in the corresponding A-MPDU subframe comprising 4×a+b octets and in response to (4−b)×8 being smaller than K−1, wherein the OPF comprises 4−b octets and the at least one HARQ padding field comprises (K−1)−(4−b)×8 octets, and wherein a is a non-negative integer, m is a positive integer, b is a positive integer and 1≤b≤3, and K is the depth of the encoder in bit.

8. The method of claim 5, wherein the at least one padding field comprises an original padding field (OPF) in response to the second length of the MPDU field in the corresponding A-MPDU subframe having 4×a+b octets and in response to (4−b)×8 being equal to or greater than K−1, wherein the first length of the at least one padding field comprises 4−b octets, and wherein a is a non-negative integer, m is a positive integer, b is a positive integer and 1≤b≤3, and K is the depth of the encoder in bit.

9. A computing device comprising at least one processor and a memory coupled to the processor, the at least one processor configured to perform a method, comprising:

configure an aggregated MAC protocol data unit (A-MPDU); and transmit a first message to a wireless communication device configured to receive the first message and to obtain the A-MPDU, wherein the A-MPDU comprises a plurality of A-MPDU subframes, wherein each of the plurality of A-MPDU subframes comprises at least one padding field and a respective MPDU field, wherein the first message comprises an encoded A-MPDU, wherein the encoded A-MPDU is the A-MPDU encoded by an encoder, wherein each of the at least one padding field has a first length, wherein the first length is determined by one of the following: a second length of the respective MPDU field and a depth of the encoder, wherein the at least one padding field comprises at least one HARQ padding field, wherein each of the plurality of A-MPDU subframes further comprises a MPDU delimiter field, wherein the MPDU delimiter field comprises a first field and a second field, and wherein the first field indicates a third length of a first HARQ padding field and the second field indicates the second length of the MPDU field in the corresponding A-MPDU subframe.

10. The computing device of claim 9, wherein the at least one padding field comprises the at least one HARQ padding field in response to the second length of the MPDU field in the corresponding A-MPDU subframe comprising 4×a octets, wherein the first length of the at least one padding field comprises 4×m octets, and wherein a is a non-negative integer, and m is a positive integer.

11. The computing device of claim 9, wherein the at least one padding field comprises an original padding field (OPF) and the at least one HARQ padding field in response to the second length of the MPDU field in the corresponding A-MPDU subframe comprising 4×a+b octets and in response to (4−b)×8 being smaller than K−1, wherein the OPF comprises 4−b octets and the at least one HARQ padding field comprises (K−1)−(4−b)×8 octets, and wherein a is a non-negative integer, m is a positive integer, b is a positive integer and 1≤b≤3, and K is the depth of the encoder in bit.

12. The computing device of claim 9, wherein the at least one padding field comprises an original padding field (OPF) in response to the second length of the MPDU field in the corresponding A-MPDU subframe having 4×a+b octets and in response to (4−b)×8 being equal to or greater than K−1, wherein the first length of the at least one padding field comprises 4−b octets, and wherein a is a non-negative integer, m is a positive integer, b is a positive integer and 1≤b≤3, and K is the depth of the encoder in bit.

13. A computing device comprising at least one processor and a memory coupled to the processor, the at least one processor configured to perform a method, comprising:

receive a first message from a wireless communication node; and determine an aggregated MAC protocol data unit (A-MPDU) by processing the first message, wherein the A-MPDU comprising a plurality of A-MPDU subframes, is configured by the wireless communication node, wherein each of the plurality of A-MPDU subframes comprises at least one padding field and a respective MPDU field, wherein the first message comprises an encoded A-MPDU, wherein the encoded A-MPDU is the A-MPDU encoded by an encoder, wherein each of the at least one padding field has a first length, wherein the first length is determined by one of the following: a second length of the respective MPDU field and a depth of the encoder, wherein the at least one padding field comprises at least one HARQ padding field, wherein each of the plurality of A-MPDU subframes further comprises a MPDU delimiter field, wherein the MPDU delimiter field comprises a first field and a second field, and wherein the first field indicates a third length of a first HARQ padding field and the second field indicates the second length of the MPDU field in the corresponding A-MPDU subframe.

14. The computing device of claim 13,
wherein the at least one padding field comprises the at least one HARQ padding field in response to the second length of the MPDU field in the corresponding A-MPDU subframe comprising 4×a octets,
wherein the first length of the at least one padding field comprises 4×m octets, and
wherein a is a non-negative integer, and m is a positive integer.

15. The computing device of claim 13,
wherein the at least one padding field comprises an original padding field (OPF) and the at least one HARQ padding field in response to the second length of the MPDU field in the corresponding A-MPDU subframe comprising 4×a+b octets and in response to (4−b)×8 being smaller than K−1,
wherein the OPF comprises 4−b octets and the at least one HARQ padding field comprises (K−1)−(4−b)×8 octets, and
wherein a is a non-negative integer, m is a positive integer, b is a positive integer and 1≤b≤3, and K is the depth of the encoder in bit.

16. The computing device of claim 13,
wherein the at least one padding field comprises an original padding field (OPF) in response to the second length of the MPDU field in the corresponding A-MPDU subframe having 4×a+b octets and in response to (4−b)×8 being equal to or greater than K−1,
wherein the first length of the at least one padding field comprises 4−b octets, and
wherein a is a non-negative integer, m is a positive integer, b is a positive integer and 1≤b≤3, and K is the depth of the encoder in bit.

\* \* \* \* \*